United States Patent [19]
Aurik et al.

[11] Patent Number: 6,095,086
[45] Date of Patent: Aug. 1, 2000

[54] DEVICE AND METHOD FOR AUTOMATIC MILKING OF ANIMALS

[75] Inventors: Erik Arnoldus Aurik, Haarlem; Gijs Bertus Wouter Van Veldhuizen, Lunteren; Robert Jan Nugteren, Nieuw-Vennep, all of Netherlands

[73] Assignee: Prolion B.V., Vijfhuizen, Netherlands

[21] Appl. No.: 09/155,928

[22] PCT Filed: Apr. 9, 1997

[86] PCT No.: PCT/NL97/00180

§ 371 Date: Oct. 7, 1998

§ 102(e) Date: Oct. 7, 1998

[87] PCT Pub. No.: WO97/37528

PCT Pub. Date: Oct. 16, 1997

[30] Foreign Application Priority Data

Apr. 9, 1996 [NL] Netherlands .......................... 1002815
Dec. 30, 1996 [NL] Netherlands .......................... 1004917

[51] Int. Cl.$^7$ ........................................... A01J 5/00
[52] U.S. Cl. .......................................... 119/14.02
[58] Field of Search ............... 119/14.01, 14.02, 119/14.03, 14.04, 14.08, 14.1, 14.14

[56] References Cited

U.S. PATENT DOCUMENTS 4,000,718  1/1977  Brown .................................. 119/14.03
5,069,160  12/1991 Street et al. .......................... 119/14.08
5,782,199  7/1998  Oosterling ............................ 119/14.02

FOREIGN PATENT DOCUMENTS 0270165  6/1988  European Pat. Off. .
0639327  2/1995  European Pat. Off. .
3702465  8/1988  Germany .
9603031  2/1996  WIPO .

*Primary Examiner*—Thomas Price
*Attorney, Agent, or Firm*—Webb Ziesenheim Logsdon Orkin & Hanson, P.C.

[57] ABSTRACT

A device and method for the automatic milking of animals is disclosed. The device includes at least two milking stalls that are positioned one after the other in a lengthwise direction. The stalls are provided on one of the long sides with an entrance door and exit door, each movable with a drive device. Animals can walk via the exit door and a passageway out of the milking stall to an accommodation area. The access to the second and subsequent stalls crosses the passageway. The device further includes an access gate through which the entrance door of the milking stalls is directly accessible from the waiting area.

10 Claims, 3 Drawing Sheets

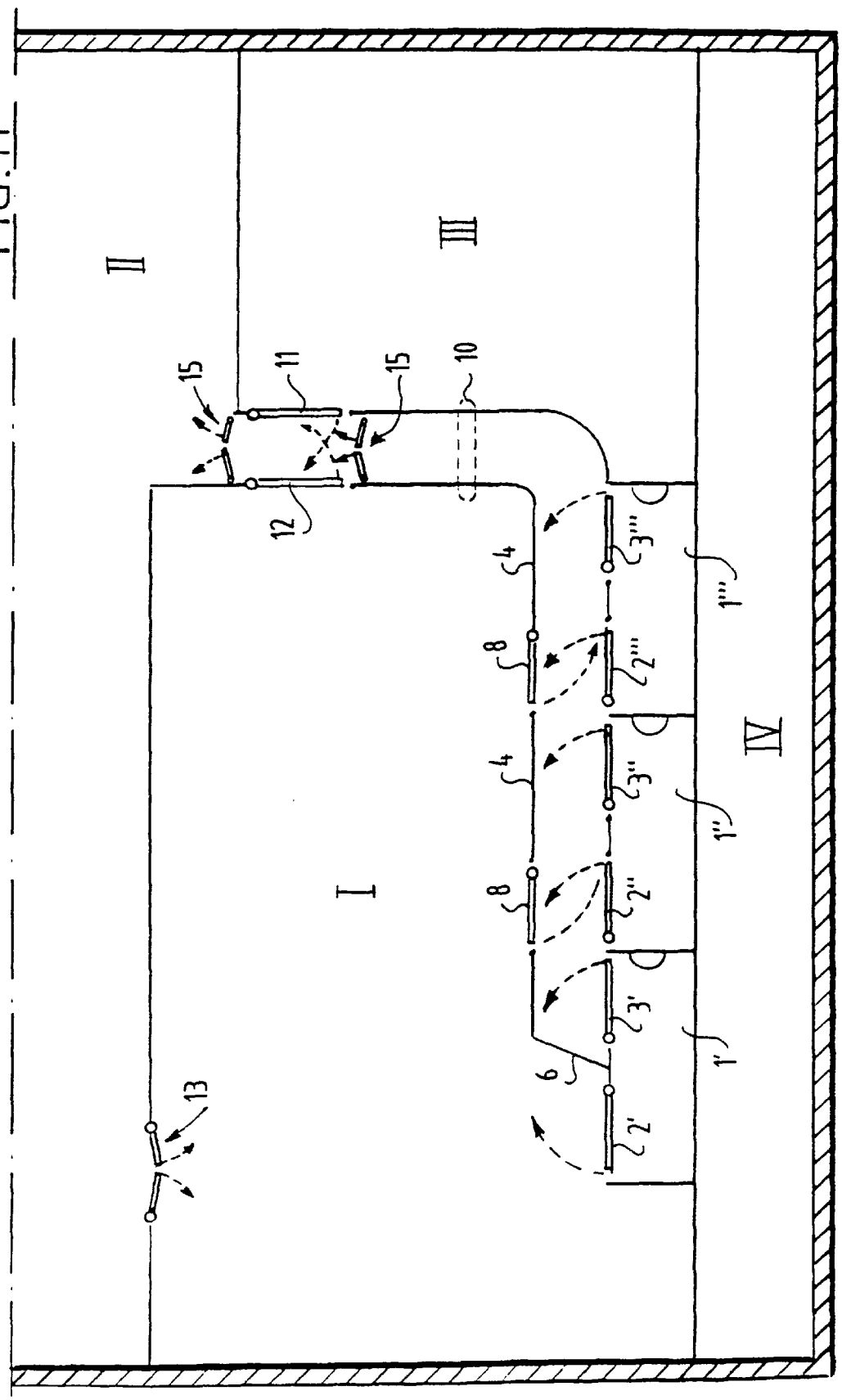

DEVICE AND METHOD FOR AUTOMATIC MILKING OF ANIMALS

BACKGROUND OF THE INVENTION

1. Field of the Invention

The invention relates to a device for unmanned milking of animals with an automatically operating control system, that includes two or more milking stalls which are placed one after another in lengthwise direction and which are provided on a long side with an entrance door movable with drive means and an exit door movable with drive means, a waiting area for animals for milking, a passageway to an accommodation area which runs from the exit door of the first milking stall along the long side of the other milking stalls along which milked animals can leave the milking device and a separating fence along the passageway on the side remote from the milking stalls.

2. Description of the Prior Art

Such milking devices are known inter alia from EP 0270165. The drawback of the known device is that the cows enter the first and further milking stall via a passageway, wherein the cows must walk one behind another. The cows must herein always wait for each other, when entering or leaving a milking stall. Long waiting times can hereby occur and the milking stalls are not always utilised optimally. These waiting times occur particularly when one cow of a high rank stands still for the entrance of or in the passageway and the other cows do not push her aside. The capacity of the installation is hereby limited. The invention has for its object to increase the capacity of the known milking device by improving the access to the milking stalls.

SUMMARY OF THE INVENTION

According to the invention, a separating fence is provided close to the entrance door of a second milking stall or subsequent milking stall. The separating fence may have an access gate movable with drive means which can leave clear an access path from the waiting area to the relevant milking stall.

Thus is achieved that at two or more locations there is access to the milking stalls and that one cow can no longer prevent other cows from being milked.

In accordance with an embodiment of the invention, a separating fence between the passageway and the waiting area is provided with at least one access gate for creating an access path crossing the passageway near an entrance gate of a further milking stall. In this way a short path is created giving direct access from the waiting area to the further milking stalls.

In accordance with an embodiment of the invention, either the opened access gate or the opened entrance gate forming an entrance path to a further milking stall prevents direct access from the waiting area to the part of the passageway leading to the accommodation area.

Thus is achieved in simple manner that a cow cannot enter that part of the passageway which is in open connection with the accommodation area without having visited a milking stall.

According to a further embodiment of the invention, coupling means are provided between an entrance gate of a further milking stall and an associated access gate so that both gates can be moved by combined drive means. Control of the access gates is greatly simplified hereby because they are mainly actuated by the entrance doors.

According to a further embodiment of the invention the hinges of the entrance gate(s) and the exit gate(s) of the further milking stalls are arranged such that both gates open on the side remote from the first milking stall. Hereby it is prevented that a cow gets jammed in the passageway with her hipbone between a gate that opens and the separating fence. Now the opening gate will stimulate the cow to walk on or take a step back.

According to another feature of the inventions the separating fence is provided with a return gate for providing a return path from the exit gate of the last milking stall to the waiting area. In simple manner is thus achieved that the animals for whom connecting the teat cups has failed can be sent back to the waiting area via a short path by making an opening in the separating fence. Not longer having to walk a long path this will reduce congestion.

In an embodiment where each milking stall is provided with sorting means placed in the passageway after the last milking stall for connecting the passageway with either the waiting area, the accommodation area or a segregation area, an identification device co-acting with the sorting means is arranged in the passageway in front of the sorting means. Hereby it is achieved that an animal with a particular problem which causes her to be guided to a destination as the segregation area or the waiting area, which destination differs from the destination of the animals before she can leave the milking stall directly without having to wait until all animals have left the passageway to the sorting means. The milking stalls can now operate independently of each other whereby control becomes simpler and whereby the waiting times decrease and the capacity of the device therefore becomes greater.

The invention also includes a method for automatic milking of animals with an embodiment of the invention, wherein an access gate, an exit gate and a return gate are controlled such that a return path from a milking stall to the waiting area crossing the passageway is formed. The animals can so directly return to the waiting area and wait for a next milking turn. The passageway is herein used only for a short time.

See further original description, page 4, line 3. hardly at all or for a very short time, whereby the capacity of the device increases.

The invention will be elucidated hereinbelow with reference to a drawing of a number of embodiments.

BRIEF DESCRIPTION OF THE DRAWINGS

FIG. 11 is a schematic top view of a fifth embodiment.

DETAILED DESCRIPTION OF THE PREFERRED EMBODIMENTS

The different embodiments discussed hereinafter are with reference to an automatic milking device, wherein it is assumed that the teat cups of a milking cluster are arranged with automatically operating equipment round the teats of a cow, which can take place without human supervision.

This automatic placing equipment is relatively expensive and the aim is therefore to use one robot, the teat cups of which can be connected to the udder of a cow in a plurality of stalls.

In the shown embodiments the milking stalls are placed for this purpose in a straight line and the placing equipment can move in rectilinear manner along one of the long sides of the milking stalls. It is of course also possible for the placing equipment to follow a circular path and the milking stalls to be placed one after another in a circular arc.

In an automatic milking device which must be able to operate without the supervision of the farmer it is important that the cows are urged or stimulated to visit a milking stall and it must be ensured that all cows are milked before they can walk to the accommodation area. The problem may occur herein that cows follow each other, which is not permissible when entering the milking stalls. The gates movable with drive means must therefore always be so placed that a cow following the first cow can be pushed back to the waiting area.

When the cows walk through the paths it must be prevented that the cows become jammed between the moving and stationary gates. To this end sensors can be arranged in known manner on the gates with which the movement of the gates can be stopped if the gate comes up against a cow. Detectors may also be arranged in the passageways with which the position of the cows can be determined.

Present for the purpose of controlling the fences and the placing device is a control system which makes use inter alia of the above mentioned sensors and detectors as well as of other known systems in such a milking device, such as for instance an identification system for the cows, milk quantity meters, feed dosages and so on. These known components of the milking device are assumed known here and not further elucidated.

In the different figures corresponding components always have as far as possible the same reference, wherein the same component for the first milking stall is provided with one accent, the second milking stall with two accents and the third milking stall with three accents.

Figure 1:
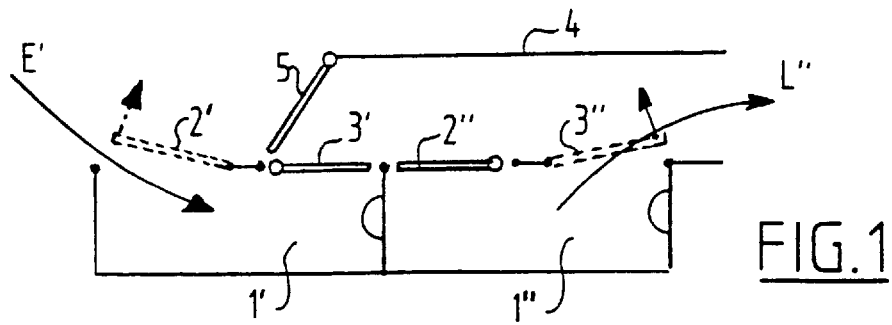
FIGS. 1 and 2 show a schematic top view of a first embodiment of an automatic milking device for cows with two milking stalls placed in line, showing first position of an access gate.

FIG. 1 shows a first milking stall 1' and a second milking stall 1", or further milking stall which milking stalls are placed in a straight line. Each milking stall 1 is provided with an entrance door 2 and an exit door 3 which are arranged hingedly roughly in the middle of a long side. Entrance door 2 and exit door 3 are shown as simple straight gates, but it is also possible in known manner for the gates to have a second hinge or optionally an additional pivotable part. Also shown is a separating fence 4 which forms a passageway with the long side of the milking stalls. A swivel gate 5 is placed between separating fence 4 and the first milking stall 1'.

Entrance door 2, exit door 3 and swivel gate 5 are movable by drive means under the influence of a control (not shown). Known drive means are for instance air cylinders, whereby the fences can make a steady movement.

The first milking stall 1' can be entered as according to an arrow E' by a cow present in a waiting area, the second milking stall 1" can be exited as indicated with an arrow L", wherein the cow can walk from milking stall 1" to an accommodation area. The waiting area and the accommodation area can be separate spaces in a shed, but may also be segregated parts of a meadow, this as elucidated in PCT/NL95/00261 of the same applicant.

Figure 2:
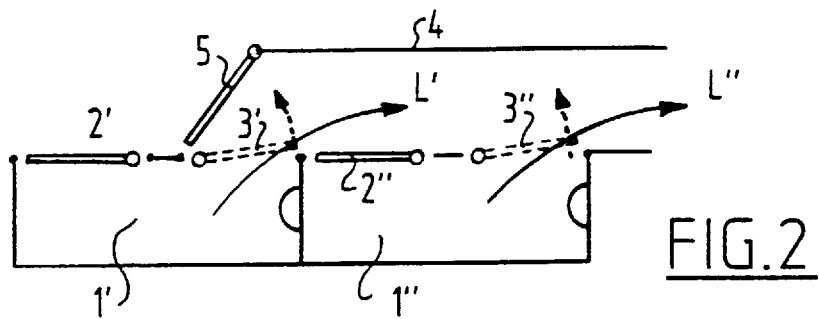

FIG. 2 shows an arrangement and position of the fences comparable to FIG. 1 which indicates that the first stall 1' can be exited as according to an arrow L'.

Figure 3:
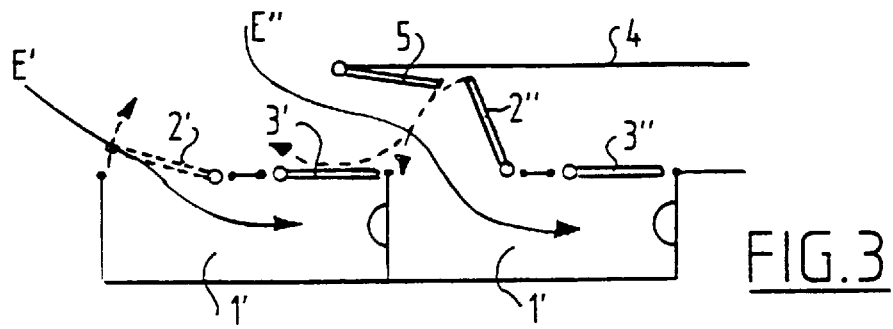
FIG. 3 shows a schematic top view as according to FIGS. 1 and 2 with a second position of the access gate.

In FIG. 3 is shown a situation wherein the second milking stall 1" can be entered as according to arrow E". For this purpose the entrance door 2" is first opened, which entrance door 2" thereby simultaneously blocks the passageway between the milking stalls and separating fence 4. Simultaneously or optionally after a short time delay the swivel gate 5 swivels to a position along separating fence 4 so that access to the second milking stall 1" is created.

After a cow has entered the second milking stall 1" the swivel gate 5 swivels back to the position as shown in FIGS. 1 and 2. A second cow which has followed the first is herein pushed back. Simultaneously or optionally after a short time delay the entrance door 2" closes and pushes the cow into its milking position in the second milking stall 1".

As shown in FIG. 3, there are two access routes E' and E" for the cows in this arrangement, which access routes E' and E" lie a substantial distance apart. It is hereby not possible for one cow to obstruct the access to the milking installation.

Figure 4:
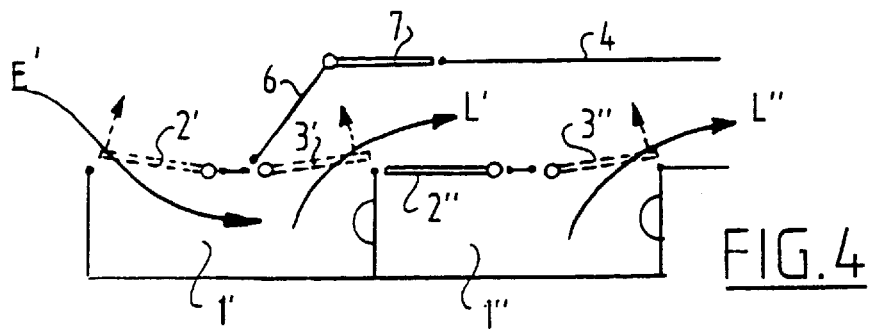
FIG. 4 is a schematic top view of a second embodiment of an automatic milking device for cows with two milking stalls placed in line, showing a first position of an access gate.
Figure 5:
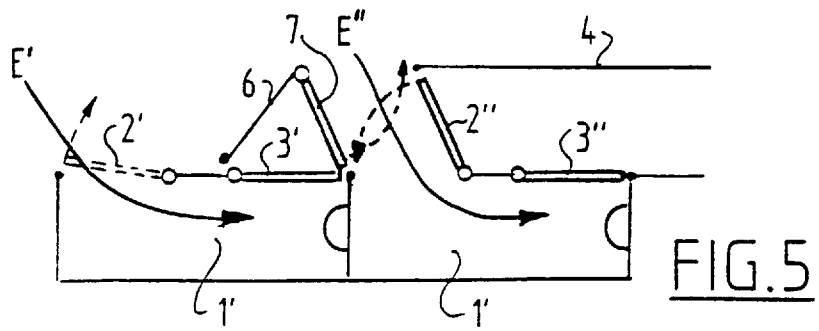
FIG. 5 is a schematic top view as according to FIG. 4 with a second position of the access gate.
Figure 6:
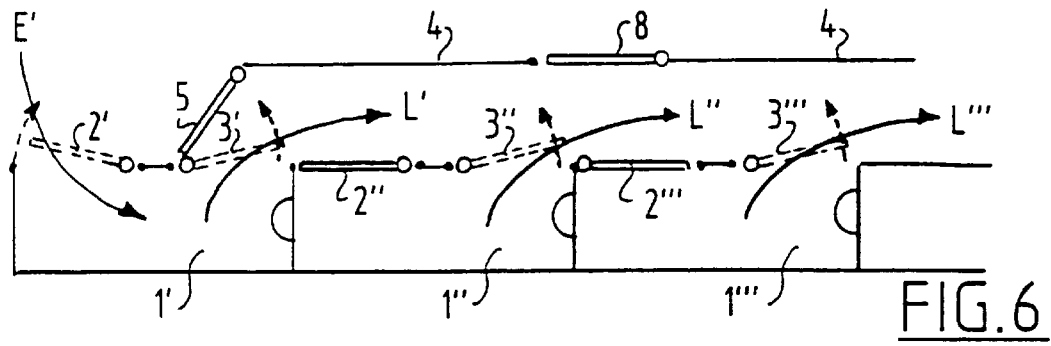
FIG. 6 is a schematic top view of a third embodiment of a milking device with three milking stalls and two access gates.
Figure 7:
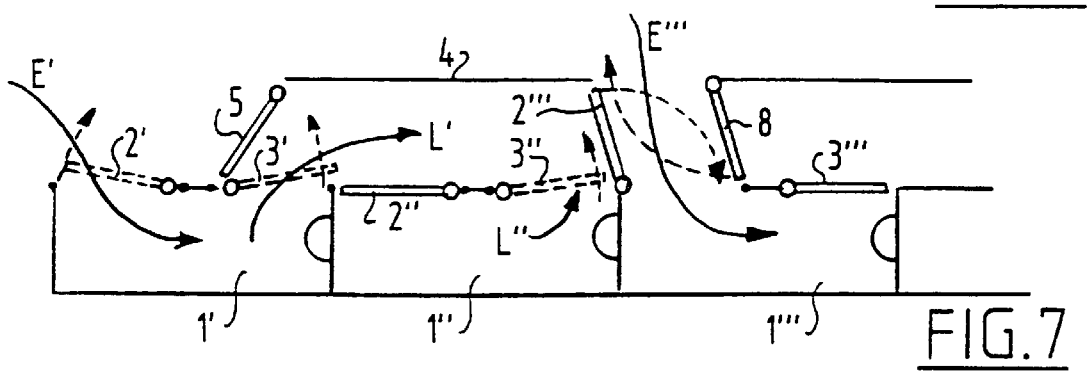
FIG. 7 is a schematic top view as according to FIG. 6, wherein the first and third milking stall are accessible.
Figure 8:
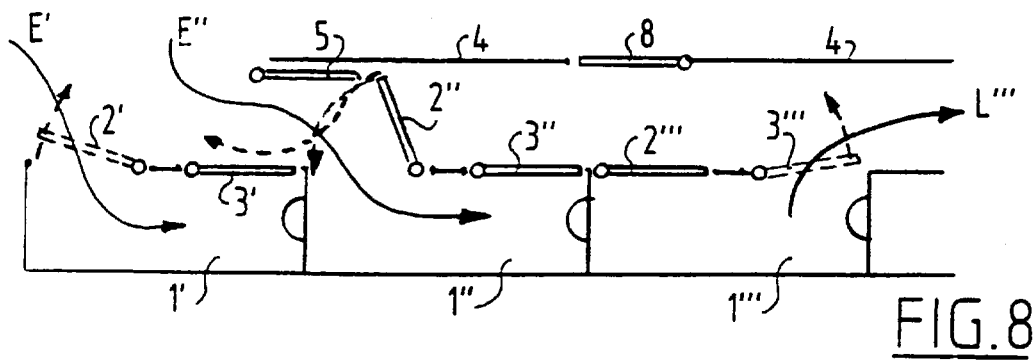
FIG. 8 is a schematic top view as according to FIG. 6, wherein the first and second milking stall are accessible.
Figure 9:
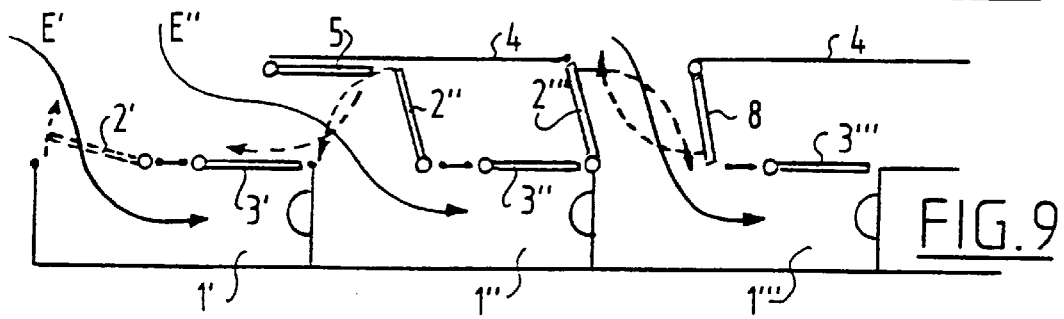
FIG. 9 is a schematic top view as according to FIG. 6, wherein three stalls are accessible.

FIGS. 4 and 5 show an embodiment wherein separating fence 4 is connected to the middle of the first milking stall 1' by a fixed end fence 6 and wherein the access to the second milking stall 1" is reached via an access gate 7 which is placed in separating fence 4 roughly opposite entrance door 2" of the second milking stall 1". The operation of this embodiment is comparable to that as described above, where the access routes E' and E" have an even greater distance therebetween.

FIGS. 6–9 show an embodiment with three stalls, including the first milking stall 1', the second milking stall 1" and a third and still further milking stall 1'". Access to the first milking stall 1' and second milking stall 1" is comparable to that as shown in FIGS. 1–3. Access to the third or last milking stall 1'" in the series takes place via an access gate 8 in a manner comparable to that discussed in the access to the second milking stall 1" of FIGS. 4 and 5. In FIGS. 6–9 the access door 2'" of the third milking stall 1'" is embodied with a hinge on the side of the first milking stall 1', wherein the hinge of access gate 8 is also placed on the other side. Placing of the hinge of access door 2'" on the side of the first milking stall 1' has the advantage that a cow cannot become jammed with its hipbone.

Figure 10:
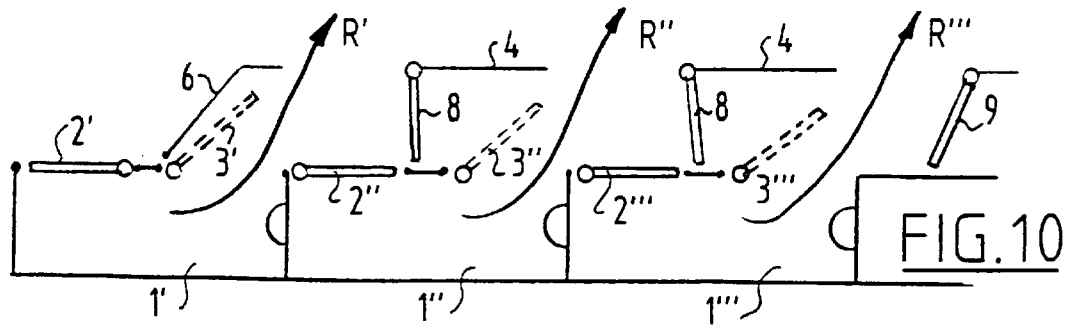
FIG. 10 is a schematic top view of a fourth embodiment wherein a return gate is incorporated in the separating fence.

FIG. 10 shows an embodiment wherein the second and subsequent milking stalls are accessible via an access gate 8 and wherein a return gate 9 is also placed in separating fence 4. By closing off the passageway in the direction of the accommodation area with return gate 9 it is possible to ensure that cows which have visited a milking stall but to which connection of the teat cups of the milking cluster has not been successful are guided back to the waiting area as indicated with arrows R', R" and R'". The embodiment shown in FIG. 10 is a combination of the access to the third stall as according to FIGS. 6–9 and the access to the second stall as according to FIGS. 4 and 5.

FIG. 11 shows a milking device with a waiting area I, an accommodation area II, a segregation area III and a operating area IV. By means of a one-way gate 13 the animals are held in the waiting area I. Animals which leave a milking stall 1 can be guided back from the passageway to waiting area I via a first separation gate 12 or to segregation area III via a second separation gate 11. Guided into segregation area III are those cows to which the farmer must pay particular attention, either because he has entered this in the control system or because the system has determined that this is necessary. In order to cause separation gates 11 and 12 to operate independently of the sequence in which the animals walk out of the milking stalls, an identification device 10 is placed in the passageway. When an animal leaves a milking stall, it is determined in the control whether it must be guided to accommodation area II, waiting area I or segregation area III. It then walks through the passageway and before arriving at the separation gates it is identified with the identification device 10 and it is determined from the control which position the separation gates 11 and 12 must take. In this manner is achieved that these control fences are as it were actuated by the animal approaching these fences and it is unnecessary for a record to be made in the control with sensors suitable for this purpose of where the animal is located in the passageway and when it will arrive at the separation gates. The distance between identification device 10 and separation gates 11 and 12 is chosen such that there is sufficient time for these fences to be able to assume the desired position. Provisions are optionally made that the cow will not begin to walk too quickly or the identification device 10 is placed in a bend.

Also shown in FIG. 11 are one-way gates 15 which ensure that animals cannot enter the passageway from accommodation area II or segregation area III.

As will be apparent from the description of the above described embodiments, the form of the fences can be adapted to the situation of the available space, desired capacity for milking and the characteristics of the herd. It is also possible to embody the shed with two, three and four or more milking stalls.

What is claimed is:

1. A device for unmanned milking of animals comprising a waiting area where the animals remain before milking, an accommodation area whereto the animals proceed after milking, at least two milking stalls including a first milking stall and a further milking stall placed one after the other and each on one side provided with an entrance gate and an exit gate, an access path for connecting the entrance gate of each milking stall with the waiting area, a passageway along the exit gate of the first milking stall and the entrance gate and the exit gate of the further milking stall for connecting the exit gates of the milking stalls with the accommodation area and control means for controlling the unmanned milking and the automatic opening and closing of the various gates, the device further including access means for creating at least one separate access path from the waiting area to the entrance gate of the further milking stall, with said separate access path lying apart from the access path to the first milking stall.

2. The device as claimed in claim 1, further including a separating fence between the passageway and the waiting area having at least one access gate for creating an access path crossing the passageway near the entrance gate of the further milking stall.

3. The device as claimed in claim 2, wherein one of the at least one access gate and the entrance gate of the further milking stall when opened forms an entrance path to the further milking stall and prevents direct access from the waiting area to the part of the passageway leading to the accommodation area.

4. The device as claimed in claim 2, further including coupling means provided between the entrance gate of the further milking stall and the at least one access gate so that the entrance gate and the at least one access gate can be moved by combined drive means.

5. The device as claimed in claim 2, wherein the separating fence is provided with a return gate for providing a return path from the exit gate of a last milking stall to the waiting area.

6. The device as claimed in claim 1, wherein hinges of the entrance gate and the exit gate of the further milking stall are arranged such that the entrance gate and the exit gate are open on the side remote from the first milking stall.

7. The device as claimed in claim 1, further including a sorting means placed in the passageway after a last milking stall for connecting the passageway with the waiting area, and an identification device co-acting with the sorting means positioned in the passageway in front of the sorting means.

8. The device as claimed in claim 1, further including a sorting means placed in the passageway after a last milking stall for connecting the passageway with the accommodation area, and an identification device co-acting with the sorting means positioned in the passageway in front of the sorting means.

9. The device as claimed in claim 1, further including a sorting means placed in the passageway after a last milking stall for connecting the passageway with the segregation area, and an identification device co-acting with the sorting means positioned in the passageway in front of the sorting means.

10. A method for unmanned milking of animals using a device comprising:

a waiting area where the animals wait before milking, an accommodation area whereto the animals proceed after milking, at least two milking stalls including a first milking stall and a further milking stall placed one after the other and each on one side provided with an entrance gate and an exit gate, an access path for connecting the entrance gate of each milking stall with the waiting area, a passageway along the exit gate of the first milking stall and the entrance gate and exit gate of the further milking stall for connecting the exit gates of the milking stalls with the accommodation area and control means for controlling the unmanned milking and the automatic opening and closing of the various gates;

access means for creating at least one separate access path from the waiting area to the entrance gate of the further milking stall, said access path lying apart from the access path to the first milking stall; and a separating fence between the passageway and the waiting area having at least one access gate for creating an access path crossing the passageway near the entrance gate of the further milking stall, wherein the separating fence is provided with a return gate for providing a return path from the exit gate of a last milking stall to the waiting area, comprising the step of:

controlling the at least one access gate, the exit gates of the milking stalls and the return gate such that a return path from each of the milking stalls to the waiting area crossing the passageway is formed.

\* \* \* \* \*

UNITED STATES PATENT AND TRADEMARK OFFICE
CERTIFICATE OF CORRECTION

PATENT NO. : 6,095,086
DATED : August 1, 2000
INVENTOR(S) : Erik Arnoldus AURIK et al.

It is certified that error appears in the above-identified patent and that said Letters Patent is hereby corrected as shown below:

Column 2 Line 7 "inventions" should read --invention,--.

Column 2 Lines 39-41 delete "See further original description, page 4, line 3. hardly at all or for a very short time, whereby the capacity of the device increases."

Column 2 Line 48 "showing" should read --with a--.

Column 2 Line 51 "with" should read --showing--.

Column 2 Line 54 "showing" should read --with--.

Column 2 Line 56 after "view" delete --as--.

Column 2 Line 56 "with" should read --showing--.

Column 2 Line 62 after "view" delete --as--.

Column 2 Line 63 "stall" should read --stalls--.

Column 2 Line 64 after "view" delete --as--.

Column 2 Line 65 "stall" should read --stalls--.

Column 2 Line 66 after "view" delete --as--.

Signed and Sealed this

Tenth Day of April, 2001

*Attest:*

NICHOLAS P. GODICI

*Attesting Officer*     *Acting Director of the United States Patent and Trademark Office*